March 31, 1942.  J. M. MILAN  2,278,144

DISK BRAKE

Filed June 29, 1940　　2 Sheets-Sheet 1

INVENTOR
Joseph M. Milan.
BY Dike, Calver + Gray
ATTORNEYS.

March 31, 1942.  J. M. MILAN  2,278,144
DISK BRAKE
Filed June 29, 1940　　2 Sheets-Sheet 2
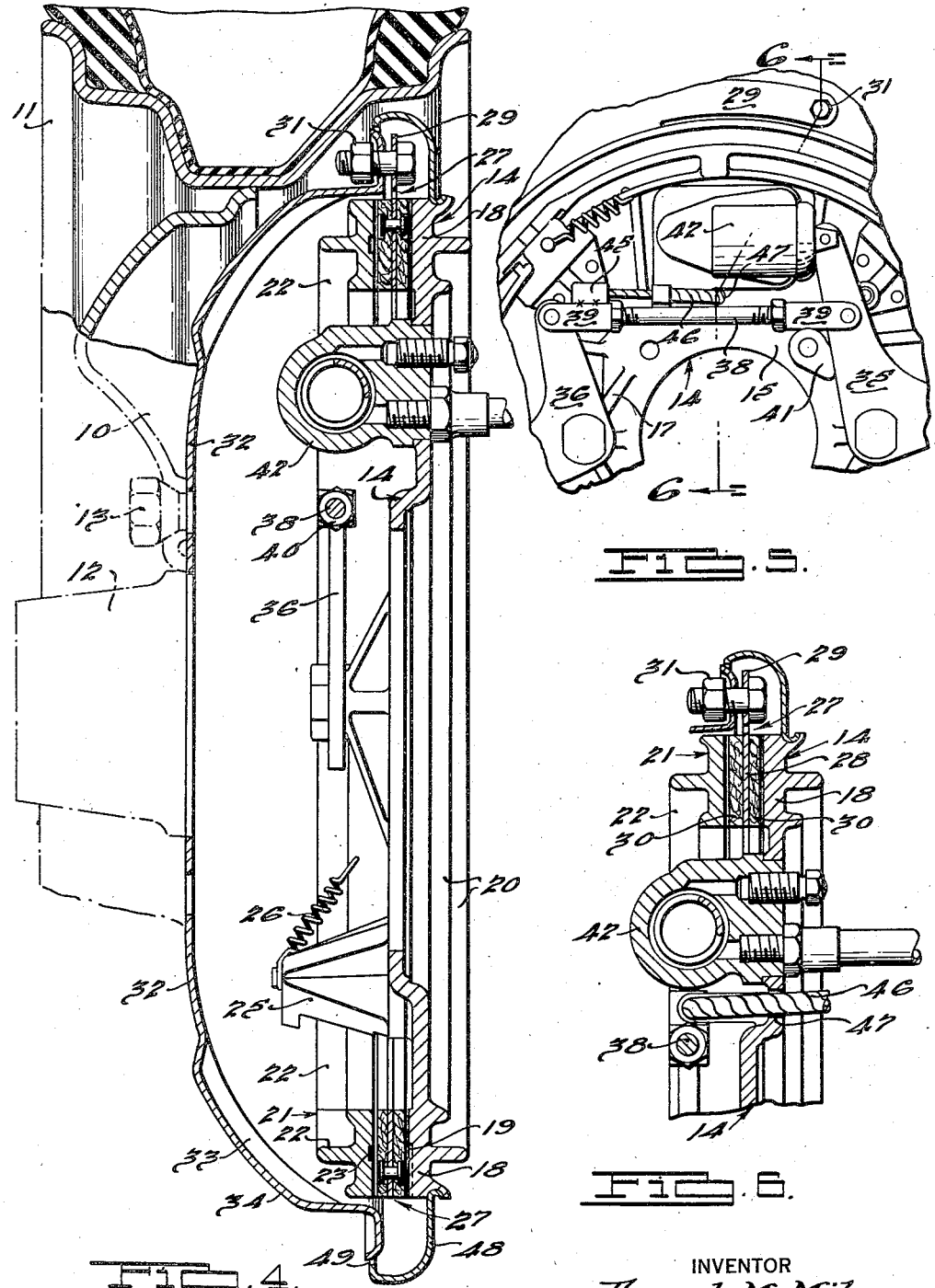
INVENTOR
Joseph M. Milan.
BY Dike, Calver & Gray
ATTORNEYS.

Patented Mar. 31, 1942

2,278,144

UNITED STATES PATENT OFFICE 2,278,144

DISK BRAKE

Joseph M. Milan, Highland Park, Mich.

Application June 29, 1940, Serial No. 343,093

11 Claims. (Cl. 188—72)

The present invention relates to disk brakes and, more particularly, to such brakes wherein provision is made for introducing a so-called "servo" action or self-energizing effect.

It is desirable, particularly in motor vehicle brakes, to provide some arrangement whereby the braking force applied by the operator is augmented or increased by an additional or so-called servo force derived from the kinetic energy of the moving vehicle.

It is, therefore, one object of the invention to provide in a disk brake, effective and satisfactory means for creating a servo effect. More specifically, according to the present invention torque received by a non-rotating plate from a rotating friction member is utilized to further engage the plate and member to increase the brake applying force.

Another object of the invention is to provide a disk brake having the foregoing characteristics which is relatively simply but sturdily constructed; one which is effective in operation, readily serviced and adjusted in use and which has a relatively long operating service life with a minimum of required adjustments.

It is another object of the invention to provide a disk brake in which the manual and servo applying operations are readily and effectively controlled by the operator and in which the brake is constructed from a simple, compact, and rigid arrangement of parts. In this connection, the present invention provides for the actuation of the brake from within the vehicle by hydraulic mechanisms, mechanical link and lever systems, combinations thereof in one brake applying means, or independently operating applying means. Moreover, due to the simplified design of a brake embodying the present invention, practically all of the parts thereof may be stamped so that the invention provides a light and inexpensive brake mechanism without hampering effective operation of the brake or shortening its service life. Also the brake parts may, if desired, be formed of a light but strong aluminum alloy thereby materially decreasing the weight of the brake.

Still another object of the invention is to provide improved cooling means for a disk brake, in particular a disk brake having parts formed of an aluminum alloy.

Other objects and advantages of this invention will appear in the following description and appended claims, reference being had to the accompanying drawings forming a part of this specification wherein like reference characters designate corresponding parts in the several views.

Fig. 4 is an enlarged section taken substantially along the staggered section line 4—4 of Fig. 1 in the direction of the arrows.

Fig. 5 is a fragmentary elevation of a brake embodying a modified form of the present invention.

Fig. 6 is a fragmentary sectional view taken substantially along the staggered section line 6—6 of Fig. 5 in the direction of the arrows.

Figure 1:
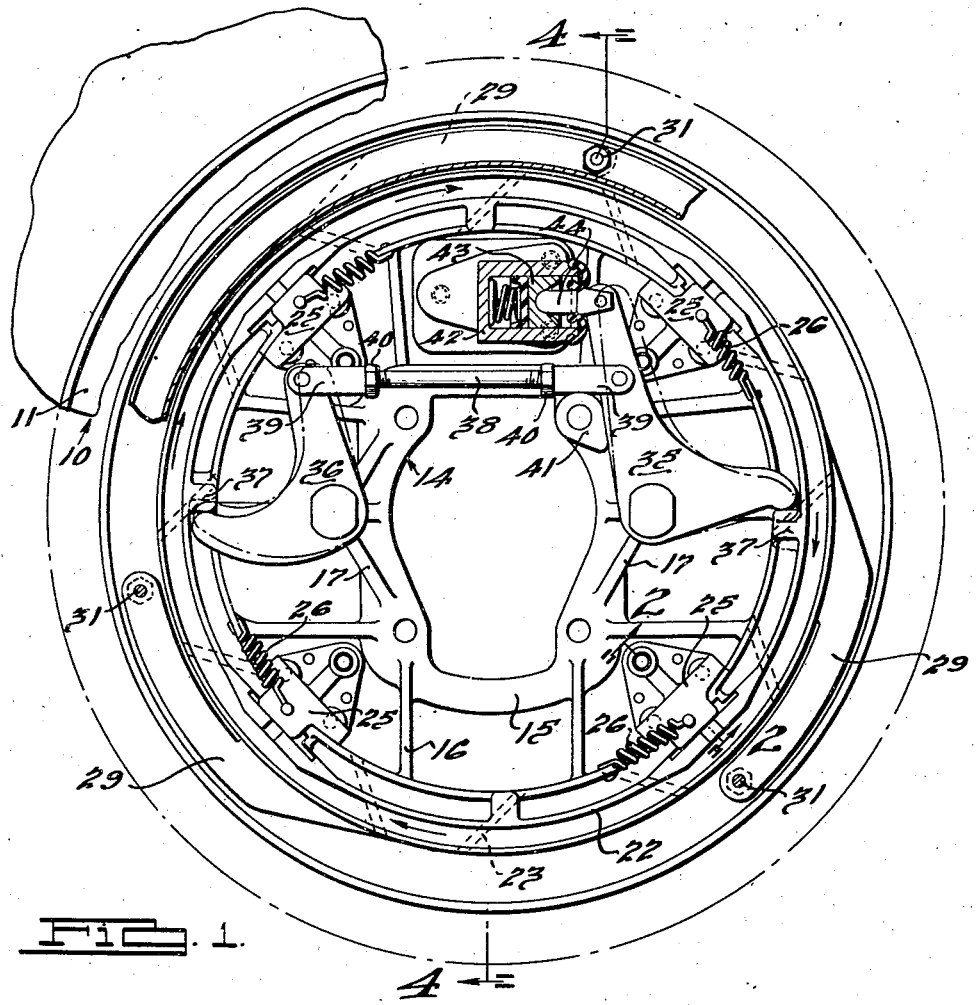
Fig. 1 is an elevation, with parts broken away, of a brake embodying the present invention and shows a fragmentary elevation of a portion of the vehicle wheel.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A disk brake embodying the present invention consists essentially of the following elements:

A stationary backing plate, a pressure plate spaced from the backing plate and movable relative thereto, and a friction member or disk provided with braking surfaces and interposed in the space between the pressure and backing plates. This friction member is connected for rotation with the vehicle wheel. In addition, brake applying means is provided and braking action is accomplished by moving the pressure plate toward the backing plate to engage the surface of the rotating friction disk between the non-rotating pressure plate and the stationary backing plate. Such brake applying movement of the pressure plate is accomplished, according to the present invention by fixed cam or wedge members carried by the backing plate which are contacted by rollers on the pressure plate. On movement of the pressure plate to apply the brake, these cam or wedge members direct the pressure plate toward the backing plate.

Referring more expressly to the present invention a preferred embodiment thereof is illustrated in Figs. 1 to 4 inclusive of the accompanying drawings and is shown as applied to a front vehicle wheel 10 of conventional construction. The wheel 10 is provided with the usual rim 11 and is secured to the hub 12 as by studs 13 (Fig. 4). The hub 12 is mounted for rotation on an axle which is not shown in the drawings, but which may, for instance, be the stub axle attached to the conventional steering spindles used in connection with the front wheels of an automobile.

The brake of the present invention includes a stationary backing plate 14 which is mounted on a non-rotating part of the vehicle structure. For instance it may be attached to a bracket carried on the steering spindle (not shown). The backing plate 14 is preferably formed of stampings and may be made of any suitable material, although a light but strong aluminum alloy has been found to be satisfactory and is recommended. As best shown in Fig. 1, the backing plate 14 consists of a generally annular center portion 15 from which reinforcing arms 16 extend. In addition, a plurality of arms 17 project from the center portion 15 of the backing plate 14 and are utilized for supporting the bell crank levers 35 and 36 which form a part of the brake applying means more fully described hereinafter. In addition, the backing plate 14 is provided with a peripheral rim portion 18 (Fig. 4) within which a plurality of slots 19 are formed. In addition, the backing plate 14 is provided with concentric ribs or fins 20 utilized for heat radiating purposes. Together with the slots 19 which act as air conducting passages, these fins serve as cooling means for the backing plate.

The reference numeral 21 represents, in general, a pressure plate which also may be stamped and may be formed of a suitable material such as the aforementioned aluminum alloy. This pressure plate is generally annular in shape and is provided with heat radiating ribs or fins 22 extending concentrically about its outer surface in a manner similar to the ribs 20 on the backing plate 14. Moreover, the pressure plate 21 is provided with slots 23 extending from its periphery to its open central portion as clearly indicated in Fig. 1. The fins 22 and slots 23 are utilized in cooling the pressure plate in a manner similar to the fins 20 and slots 19 on the backing plate. The pressure plate 21 is also provided with rollers 24 (Figs. 2 and 3) which are suitably operably carried by the pressure plate. For instance, the roller 24 may be inserted in suitable slots in an embossed part of the pressure plate, as indicated in particular in Fig. 2.

Figure 2:
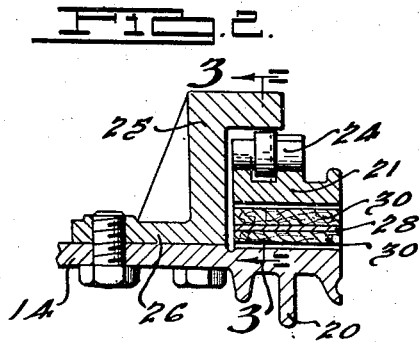
Fig. 2 is an enlarged fragmentary cross section taken substantially along the line 2—2 of Fig. 1 in the direction of the arrows.
Figure 3:
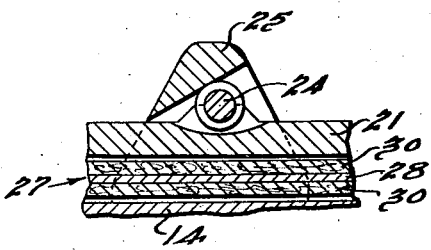
Fig. 3 is a longitudinal section taken substantially along the line 3—3 of Fig. 2 in the direction of the arrows.

The pressure plate 21 is maintained in spaced relationship to the backing plate 14 principally by means of the upstanding cam or wedge members 25. These members are securely fixed to the backing plate by suitable means. For example, they may be provided with a flanging 26 which is bolted to the backing plate 14 in a manner clearly indicated in Fig. 2. Moreover, these upstanding members 25 are provided with cam or wedge surfaces which are spaced from but face the backing plate, see Fig. 3. The rollers 24 of the pressure plate 21 are positioned in the space between these cam surfaces and the backing plate and contact these surfaces in the manner clearly indicated in Fig. 3. Consequently, the pressure plate is spaced from the backing plate and is held in this position by means of the springs 26 (Fig. 1). One end of each of the springs is anchored to the upstanding member 25 and the other end is anchored to the pressure plate 21. It will, therefore, be understood that the pressure plate is movable relative to the backing plate against the pressure of said springs. In particular, the pressure plate may be moved circumferentially with respect to the backing plate (in the direction of the arrows on Fig. 1) in which event the rollers 24 are moved along the cam surfaces of the cam member 25 to force the pressure plate laterally in the direction of the backing plate as indicated in Fig. 3. This combined circumferential and lateral movement of the pressure plate is accomplished by the brake actuating means more fully explained hereinafter and results in engagement of the pressure plate and the friction disk 27 to accomplish braking action.

The friction member or disk 27 is mounted for rotation with the hub 12 and is resiliently suspended in the space between the backing plate 14 and the pressure plate 21. The friction disk 27 in the present embodiment, consists of an annular plate 28 which is provided with a plurality of tangential arms 29 which, when mounted at their free ends to a supporting carrier, permit a resilient movement of the disk 27 due to a flexing of the arms 29. Disks of brake lining material 30 are secured on opposite sides of the annular plate 28 as by rivets, as clearly shown in Fig. 4. The free ends of the tangential arms 29 are secured by suitable securing means, as for example, the nuts and bolts 31 to an air induction member 32 (Fig. 4) which in turn is secured to the hub 12 by any suitable means.

The air induction member 32 is provided with a plurality of air induction openings or ports 33 adjacent to each of which a pressed out louver or air scoop 34 is provided. On rotation of the hub 12 and the air induction member 32, air is scooped into the brake by the action of the louvers 34.

The brake applying mechanism of the present embodiment includes a pair of bell crank levers 35 and 36 pivoted to the arms 17 in the manner clearly shown in Fig. 1. Consequently, these bell crank levers are mounted for pivotal movement on the backing plate 14 to which the arms 17 are fixed. One of the extending arms of each of the bell crank levers 35 and 36 contacts one of the lugs 37—37 on the pressure plate 21. Consequently, movement of the bell crank levers 35 and 36 will rotate the pressure plate 21 against the springs 26 as indicated in dotted lines in Fig. 1. During this rotation the rollers 24 ride over the cam surfaces of the cam members 25, which surfaces are preferably wedge shaped, as shown in Fig. 2. As a result, the pressure plate 21 is moved in the direction of the backing plate 14 and engages the friction member 27 between its surfaces and the surfaces of the backing plate. Controlled and synchronized action of the bell crank levers 35 and 36 is accomplished by the connecting rod 38 which interconnects the bell crank levers. This connecting rod is threaded at each end into a clevis 39, 39 pivotally attached to each of the bell crank levers and is held in position by the nuts 40. In this connection, it is desirable that right-hand threads only be utilized on the connecting rod 38, in order to prevent undesired or accidental disengagement of the connecting rod.

In view of the foregoing, it will be understood that the bell crank levers 35 and 36 and the connecting rod 38 comprise a link and lever system for moving the pressure plate and, therefore, for operating the brake mechanism. This link and lever system may be operated by any suitable actuating means operably connected therewith at any suitable point. For example, movement of the bell crank lever 35 may be accomplished by hydraulic mechanism comprising a hydraulic cylinder 42 which is mounted on the backing plate 14. A piston 43 is movable in the cylinder 42 by hydraulic fluid applied through the hydraulic system. The stud 44 moves with the piston 43 and is pivotally connected to one arm of the bell crank lever 35. Consequently, as the piston 43 is pushed out of the chamber 42 the bell crank lever 35 is swung about its pivot to rotate the pressure plate 21 in the direction of the arrows on Fig. 1. During this movement the bell crank lever 36 also similarly rotates the pressure plate 21 due to movement of the lever 36 in response to brake applying forces transmitted to it from the lever 35 through the connecting rod 38.

In the modification of the invention shown in Figs. 5 and 6 the socket 45 is rigidly fixed to the clevis 39. Within this socket is attached a cable 46 passing through a suitable opening 47 in the backing plate 14 (Fig. 6). The cable 46 may be operated from within the vehicle as by a so-called emergency brake to move the connecting rod 38 to the right as shown in Fig. 5, and therefore, to actuate the bell crank levers 35 and 36 to move the pressure plate into a braking position in the manner explained above. It will be noted that the present modification of the invention also provides for hydraulic actuation of the bell crank levers in the manner already fully described. It will be appreciated that this hydraulic brake actuating means may be controlled from a foot pedal in the vehicle while the cable 46 is controlled independently from a hand lever. However, either of these systems could be utilized solely, if desired.

In order to close the interior of the brake against the introduction of foreign material a stamped plate 48 is provided and is secured to the periphery 18 of the backing plate 14 (Fig. 4). The outer edge of this plate is turned and terminates adjacent a flange extending from the air induction member 32, as clearly shown in Fig. 4. Between the turned edge of the plate 48 and the flange on the member 32, there is, however, an opening 49 which may, if desired, be a port or ports in the plate 48 itself. This opening or port is utilized to permit the escape of air introduced into the interior of the brake by the air induction member 32.

As pointed out hereinbefore, a brake embodying the present invention is applied by moving the pressure plate 21 circumferentially relative to the backing plate 14 in the direction from the arrows on Fig. 1. Such movement of the pressure plate is accomplished by the link and lever system 35, 36 and 38 which, in turn, is actuated by the hydraulic brake applying means heretofore described or by the cable 46 (Fig. 5). As the pressure plate 14 moves circumferentially it is also directed laterally toward the backing plate 14 by the rollers 24 carried by the pressure plate which contact the cam surfaces of the cam members 25 in the manner clearly illustrated in Fig. 3. Braking action thus is accomplished by initially engaging the braking surfaces 30—30 of the rotating friction member 27 between the non-rotating pressure plate 21 and the stationary backing plate 14 by manually applied forces. It will be noted that the friction member 27 is connected for rotation with the hub 12 and that the pressure plate 21, when the brake is applied, is moved in the same direction as the friction member rotates assuming that the vehicle is moving forwardly. Consequently, when the pressure plate 21 is forced into surface contact with the rotating friction member 27, said rotating friction member carries the pressure plate 21 with it, thus further moving the pressure plate in the direction of the arrows in Fig. 1. Therefore, the rotating friction disk 27 urges the pressure plate 21 into further engagement with the friction disk and, as a result, further braking action is obtained. Thus, the present brake in part utilizes the kinetic energy of the rotating friction disk as its applying force. In other words, it is a servo or self-energizing brake. More accurately, this effect should be described as a partially self-energizing effect since the pressure plate 21 must be manually moved into engagement with the rotating friction disk 27 before any self-energizing is secured; but brakes providing any effect of this general type are often referred to in the art as "self-energized."

As the pressure plate 21 is rotated to apply the brake in the foregoing manner the springs 26 are loaded. Consequently, on release of the brake applying force, such as release of the pull applied to the cable 46 or of the force applied to the hydraulic mechanism, the springs 26 will return the pressure plate as well as the bell crank levers 35 and 36 to their non-braking positions (which are shown in solid lines in Fig. 1).

The brake cooling means of the present invention operates as follows: The air induction member 32 upon rotation of the hub 12 draws air into the interior of the brake chamber through the openings 33. This air washes the surfaces of the pressure plate 21, in particular the heat radiating fins 22 thereon. Also, part of this air is forced through the slots 23 in the pressure plate 21 and also through the slots 19 in the backing plate 14. The air is discharged through the port or opening 49. Heat generated during contact of the pressure plate and the backing plate with the friction member 27 is removed by this air flow through the interior of the brake. Moreover, due to the position of the slots 21 and 18 which are located immediately adjacent the contacting surfaces of the friction disk, pressure plate and the backing plate, this heat is effectively removed at the source of its generation. In addition, the heat radiating fins 20 on the backing plate 14 aid in removing this heat inasmuch as some heat will be conducted through the backing plate. In this connection, it will be noted that a separate air stream from that previously described washes the fins 20 on the backing plate. The cooling means of the present invention has been found to be very effective particularly when the pressure plate and the backing plate are formed of an aluminum alloy, as recommended hereinbefore, since these alloys do not as readily conduct heat as other materials such as iron or steel. Consequently, heat cannot be very effectively removed by radiation from parts of a brake formed of aluminum and must be removed at its source of generation as achieved by the cooling air stream disclosed herein.

In view of the foregoing, it will be understood that a brake embodying the present invention provides a simplified but sturdy brake mechanism in which the parts are so designed that they may be readily stamped to provide, in addition, a relatively inexpensive brake mechanism. Moreover, these parts may be made of an aluminum alloy thereby decreasing the weight of the brake materially. Moreover, a brake embodying the present invention possesses the advantages commonly attributed to disk brakes, including a greater braking surface area than a conventional shoe and drum type brake provides for a brake of a comparable diameter. However, the present braking mechanism also provides a servo or self-energizing effect which is readily controllable and which is a material aid in applying the brakes thereby decreasing the amount of force which must be supplied by the operator to brake the momentum of the vehicle. This feature is particularly useful in connection with automotive vehicle brakes. On comparative tests a brake embodying the present invention has proved to be more positive and effective in operation than other types of brakes, and also has been found to possess a longer operating service life with fewer required adjustments than brakes of conventional designs.

In addition, a brake adjusting cam 41 may be provided as shown in Figs. 1 and 5. This cam is positioned on the backing plate 14 adjacent one of the bell crank levers 35 and 36 and is operable from the outer side of the brake mechanism. The cam 41 is adapted to be adjustably fixed in place and bears against the bell crank lever for adjusting the position of the latter during its non-breaking position. Thus the cam 41 may be employed for taking up or compensating for excessive play in the operating link and lever system, and in particular may be employed to adjust the brake mechanism after wear of parts thereof, especially the friction disks 30, 30 of the rotatable member 27.

I claim:

1. A vehicle brake mechanism comprising a stationary backing plate secured to the vehicle, a pressure plate maintained in spaced relationship to said backing plate and movable circumferentially and axially relative thereto, a rotatable friction member resiliently suspended between said plates and connected to a vehicle wheel for rotation therewith, cam members fixed to said backing plate and having cam surfaces spaced therefrom, rollers on said pressure plate adapted to contact said cam surfaces, brake operating means for rotating said pressure plate to roll said rollers along said cam surfaces to direct said pressure plate toward said backing plate and engage said friction member between said pressure plate and said backing plate, and brake cooling means including a rotatable air induction member connected for rotation with the vehicle wheel.

2. A vehicle brake mechanism comprising a stationary backing plate secured to the vehicle, a pressure plate maintained in spaced relationship to said backing plate and movable circumferentially and axially relative thereto, a rotatable friction member resiliently suspended between said plates and connected to a vehicle wheel for rotation therewith, cam members fixed to said backing plate and having cam surfaces which are spaced therefrom, rollers on said pressure plate and positioned in the space between said cam surfaces and backing plate, brake operating means for rotating said pressure plate to roll said rollers along said cam surfaces to direct said pressure plate toward said backing plate and into engagement with said friction member, and brake cooling means including a rotatable air induction member connected for rotation with the vehicle wheel and air conducting passages in said pressure plate whereby a cooling air stream from said air induction member washes said pressure plate and passes through said passages.

3. A claim according to claim 2 in which the backing plate is provided with air conducting passages, whereby a part of the cooling air stream is passed through said passages.

4. A vehicle brake mechanism comprising a stationary backing plate secured to the vehicle, a pressure plate maintained in spaced relationship to said backing plate and movable circumferentially and axially relative thereto, a rotatable friction member resiliently suspended between said plates, cam members fixed to said backing plate and having cam surfaces spaced from said plate, rollers on said pressure plate positioned in the space between said cam surfaces and backing plate, brake applying means including a plurality of levers pivotally mounted on said backing plate, a rod connecting said levers, actuating means controllable from within the vehicle and connected to said applying means for moving said levers into contact with said pressure plate to move the same circumferentially of said backing plate during which movement said rollers contact said cam surfaces and direct said pressure plate toward said backing plate to engage said friction member between said pressure plate and said backing plate.

5. A vehicle brake mechanism comprising a stationary backing plate secured to the vehicle, a pressure plate maintained in spaced relationship to said backing plate and movable circumferentially and axially relative thereto, a rotatable friction member resiliently suspended between said plates, wedge members fixed to said backing plate the wedge portions thereof being spaced from and facing said plate, rollers on said pressure plate positioned in the space between said wedge portions and said backing plate, brake applying means including a pair of bell crank levers mounted on said backing plate, a rod connecting said levers, a cable controllable from within the vehicle and connected to said rod for moving said levers into contact with said pressure plate to move the same circumferentially of said backing plate to force said rollers into contact with said wedge members and direct said pressure plate toward said backing plate and establish a braking connection between said friction member, said pressure plate and said backing plate.

6. A vehicle brake mechanism comprising a stationary backing plate secured to the vehicle, a pressure plate maintained in spaced relationship to said backing plate and movable circumferentially and axially relative thereto, a rotatable friction member resiliently suspended between said plates, wedge members fixed to said backing plate and having wedge portions spaced from and facing said plate, rollers on said pressure plate positioned in the space between said wedge portions and said backing plate, brake applying means including a pair of bell crank levers mounted on said backing plate and a rod connecting said levers, hydraulic brake actuating means controllable from within the vehicle and connected to one of said levers for moving said levers into contact with said pressure plate to move the same circumferentially of said backing plate, whereby said rollers are forced against said wedge members and displace said pressure plate toward said backing plate to establish a frictional braking engagement between said friction member, said pressure plate and said backing plate.

7. A vehicle brake mechanism comprising a stationary backing plate secured to the vehicle, a pressure plate maintained in spaced relationship to said backing plate and movable circumferentially and axially relative thereto, a rotatable friction member suspended between said plates, cam members carried by one of said plates and having cam surfaces spaced therefrom, rollers on the other plate and positioned in the space between said cam members and the plate carrying the same, brake applying means including a plurality of levers pivotally mounted on said backing plate, means connecting said levers, actuating means controllable from within the vehicle and connected to said applying means for moving said levers into contact with said pressure plate to move the same circumferentially of said backing plate, during which movement said rollers contact said cam surfaces and direct said pressure plate toward said backing plate to engage said friction member between said pressure plate and said backing plate.

8. A vehicle brake mechanism comprising a stationary backing plate secured to the vehicle, a pressure plate maintained in spaced relationship to said backing plate and movable in the direction of the backing plate, a rotatable friction member suspended between said plates, cam members fixed to said backing plate and having cam surfaces spaced from said plate, rollers on said pressure plate positioned in the space between said cam surfaces and backing plate, brake applying means including a plurality of levers pivotally mounted on said backing plate, means connecting said levers, actuating means controllable from within the vehicle and connected to said applying means for moving said levers into contact with said pressure plate to move the same in the direction of said backing plate, during which movement said rollers contact said cam surfaces and direct said pressure plate toward said backing plate to engage said friction member between said pressure plate and said backing plate.

9. A vehicle brake mechanism comprising a stationary backing plate secured to the vehicle, a pressure plate maintained in spaced relationship to said backing plate and movable circumferentially and axially relative thereto, said pressure plate having one of its surfaces facing said backing plate and being provided with projections on its other surface, a rotatable friction member suspended between said plates, cam members fixed to said backing plate and having cam surfaces spaced from said plate, rollers on said pressure plate positioned in the space between said cam surfaces and backing plate, brake applying means including a member carried by the backing plate and movable relative thereto to contact said projections on said pressure plate, actuating means controllable from within the vehicle and connected to said applying means for moving said member into contact with one of said projections on said pressure plate for moving the same circumferentially of said backing plate, during which movement said rollers contact said cam surfaces and direct said pressure plate toward said backing plate to engage said friction member between said pressure plate and said backing plate.

10. A vehicle brake mechanism comprising a stationary backing plate secured to the vehicle, a pressure plate maintained in spaced relationship to said backing plate and movable circumferentially and axially relative thereto, a rotatable friction member resiliently suspended between said plates, wedge members fixed to said stationary backing plate the wedge portions thereof being spaced from and facing said plate, rollers carried by said pressure plate adapted to contact said wedge portion, and brake applying means including a lever pivotally mounted on said backing plate and controllable from within the vehicle for contacting said pressure plate to move the same circumferentially relative to said backing plate whereby said rollers are caused to contact said wedge members and to direct said pressure plate toward said backing plate for establishing a frictional engagement between said friction member, said pressure plate and said backing plate, said brake applying means also including an adjustable cam provided on said backing plate in contact with said pivoted lever for adjusting the position thereof.

11. A vehicle brake mechanism comprising a stationary backing plate secured to the vehicle, a pressure plate maintained in spaced relationship to said backing plate and movable toward the latter, a rotatable friction member resiliently suspended between said plates, cam members fixed to said stationary backing plate and spaced therefrom, rollers carried by said pressure plate adapted to contact said cam members, and brake applying means including a lever pivotally mounted on said backing plate and controllable from within the vehicle for contacting the said pressure plate to move the same toward said backing plate whereby said rollers are caused to contact said cam members to direct said pressure plate toward said backing plate for establishing a frictional engagement between said friction member, said pressure plate and said backing plate, said mechanism including an adjustable member provided on said backing plate and positioned to contact said pivoted lever for adjusting the position thereof.

JOSEPH M. MILAN.